Oct. 28, 1930.   F. R. PETERS   1,779,751
LOCOMOTIVE BOOSTER SUPPORT
Filed March 19, 1929
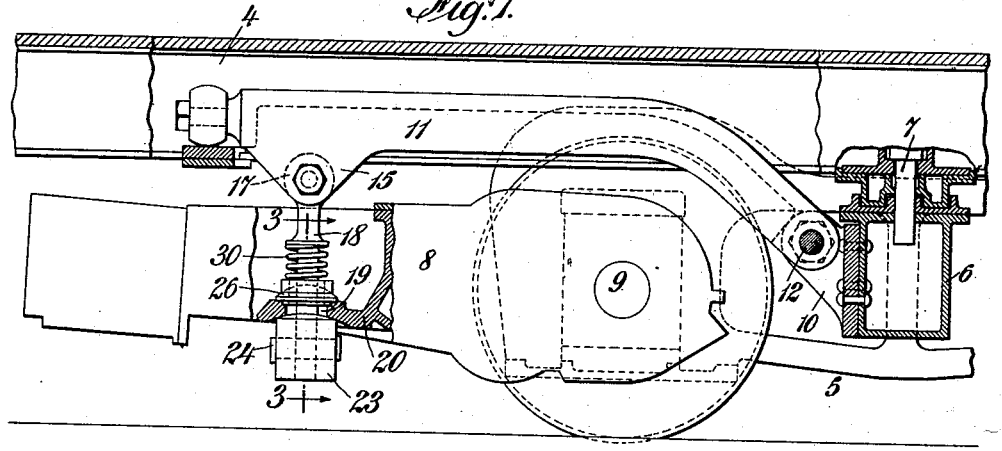
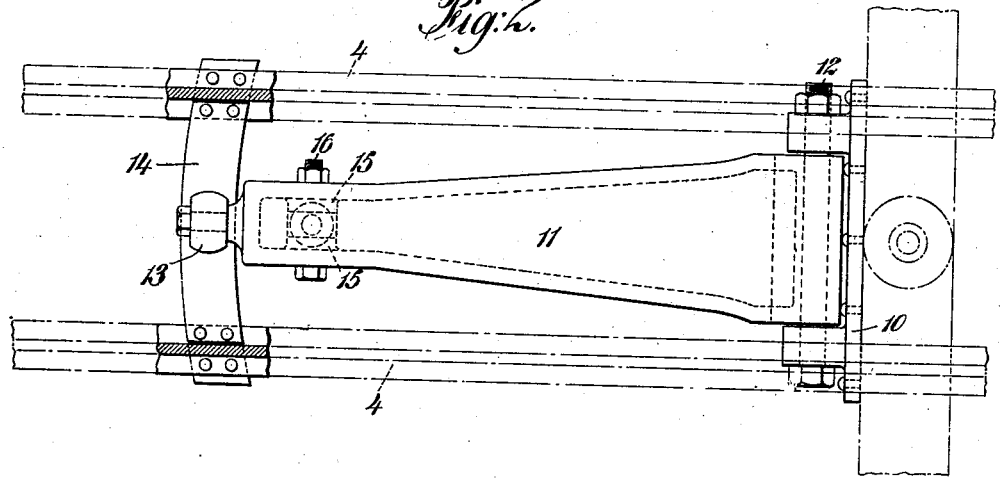
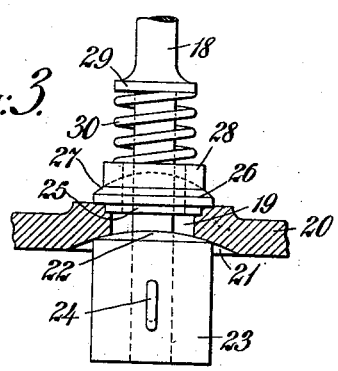

Patented Oct. 28, 1930

1,779,751

UNITED STATES PATENT OFFICE

FRANK RICHARD PETERS, OF NEW YORK, N. Y., ASSIGNOR TO FRANKLIN RAILWAY SUPPLY COMPANY, OF NEW YORK, N. Y., A CORPORATION OF DELAWARE

LOCOMOTIVE BOOSTER SUPPORT

Application filed March 19, 1929. Serial No. 348,222.

This invention relates to locomotive booster supports, particularly with suspension means for the motors of such boosters.

Among the primary objects of the invention are the provision of a suspension means which permits or accommodates itself to the rocking movements of the booster motor which are incident to the normal running of the locomotive; the provision of a supporting or suspending mechanism which yieldingly resists certain of the movements of the motor and which, therefore, constantly urges the motor to its normal operating position; and, in general, the provision of a booster motor suspension device which is simple in construction and application and which has sufficient strength to withstand the usual strains to which it is subjected.

How the foregoing together with such other objects and advantages as may hereinafter appear are obtained will be clear from a consideration of the following description taken with the accompanying drawing which illustrates a preferred embodiment of the invention, and in which Figure 1 is a side view of a portion of a tender frame and a booster equipped truck associated therewith to which the supporting or suspension device of the present invention has been applied, certain of the parts being broken away and shown in section for the sake of clarity;

Figure 2 is a somewhat diagrammatic top view of a portion of the superimposed booster supporting structure; and Figure 3 is a sectional view taken on the line 3—3 of Figure 1.

Portions of the main frame members of the tender are illustrated in Figures 1 and 2 of the drawing at 4 while the truck which is associated therewith is indicated by the reference numeral 5. The truck bolster 6 is pivoted to the frame of the tender by means of a pin 7 in accordance with usual or common truck structure. The booster motor 8 is associated with the axle 9 of the truck and extends laterally therefrom below the main frame members 4. At this point it should be understood that the apparatus of the present invention may be applied to any suitable type of pivoting or swiveling truck and also that it makes no difference whether the booster equipped truck is associated with an engine or a tender.

The overlying supporting structure for the booster motor illustrated in the drawing includes a bracket member 10 secured to the bolster 6 of the truck 5 and an arm 11 which extends outwardly therefrom over the booster motor and which is pivoted by means of the bolt 12 to the bracket 10. At its outer end the arm 11 is provided with a roller 13 which is adapted to ride back and forth across a track 14 secured to and extending between the tender frame members 4. Near its outer end the arm 11 is provided with a pair of depending lugs 15 which are apertured to receive the pin or bolt 16 for engaging and supporting the eye 17 of the booster suspending link or member 18. It should be understood, at this point, that no claim is made herein to the superimposed booster motor supporting mechanism including the arm 11. This subject matter is claimed in the copending application, Serial Number 308,378 of Frederick W. Martin, assignor to the assignee of the present application. The overlying supporting structure is claimed herein only in combination with certain of the parts to be described hereinafter.

The link 18 depends from the arm 11 and extends through an aperture 19 in the booster bed plate 20. The underside of the bed plate adjacent to the aperture 19 is provided with a concaved surface indicated at 21 which is adapted to seat on the upper convex surface 22 of the bearing block 23, the latter being secured to the lower end of the link 18 by means of a suitable key or pin 24. The bed plate 20 is further provided with an annular shoulder at the upper edge of the aperture 19, the said shoulder being adapted to engage the downwardly projecting circular portion 25 of the member 26. The member 26 in turn is provided with a rounded or convex surface 27 on its upper side which cooperates with a complementary concaved surface on the lower side of the collar or ring 28. At a point somewhat above the ring 28 the link 18 is provided with a flange 29 between which and the upper surface of the member 28 a coil spring 30 is arranged.

The operation of the device should be apparent, but it might be noted that the cooperating concaved and convex surfaces above and below the booster bed plate together with the spring 30 permit the maximum possible freedom of relative movement of the parts, particularly with respect to the frequent rocking movements which are normally set up when the vehicle passes over unevennesses or irregularities in the trackway. The device also operates to yieldingly retain the booster motor in its normal operative position and is particularly advantageous in overcoming any tendency of the booster motor to move or jerk upwardly during operation.

My invention therefore provides a link suspension device which affords the greatest possible freedom of movement and at the same time affords adequate support for the booster motor and operates to yieldingly retain the booster motor in its normal operative position.

I claim:—

1. In apparatus of the character described, a booster motor, a supporting link therefor having a bearing block at its lower end adapted to engage the booster bed plate and support the booster thereby and means above said plate and reacting therethrough against the said block to resiliently retain the booster in its normal supported position.

2. In apparatus of the character described, a booster motor, a supporting link having a bearing block at its lower end adapted to engage the booster bed plate and support the booster thereby and means above said plate and reacting therethrough against the said block to resiliently retain the booster in its normal supported position, said means including a block associated with the bed plate and a spring bearing thereagainst.

3. In apparatus of the character described, a booster motor, a supporting link having a bearing block at its lower end adapted to engage the booster bed plate and support the booster thereby and means above said plate and reacting therethrough against the said block to resiliently retain the booster in its normal supported position, said means including a block associated with the bed plate and having an upper convex bearing surface, a second block having a complementary concave bearing surface and a spring bearing downwardly against the last mentioned block.

4. In apparatus of the character described, the combination of a railway vehicle frame, a truck frame pivoted thereto, an axle mounted in the truck frame, a booster motor operatively associated with said axle and a supporting structure for said motor including a supporting member secured to the motor and hung from the vehicle frame with freedom for transverse movement with respect thereto, together with means for resiliently retaining the motor in its normal supported position.

5. In apparatus of the character described, a vehicle frame, a truck frame pivoted thereto, a pair of wheels having an axle mounted in the truck frame, a booster motor associated with said axle and a supporting member for the booster motor supported in part by the vehicle and in part by the truck, together with a link depending from said member and engaging the motor and means associated therewith for retaining the motor in its normal supported position.

6. In combination with a railway vehicle having a truck with its axle and wheels, a booster motor associated with the axle to drive said wheels, a supporting member having a pivotal connection to a part of the truck and having pivotal and swinging engagement with a part of the vehicle, a link depending from said member to engage the booster motor and means associated therewith for yieldingly retaining the motor in its norml supported position.

7. In apparatus of the character described, a booster motor, a supension link having means for engaging the booster bed plate and means associated with said link and reacting against said plate for yieldingly restraining rocking movements of the motor.

8. In combination with a booster motor, having an aperture in a part thereof, a supporting link extending downwardly through said aperture, means secured to the link below said part for engaging and supporting the motor and a spring expansively reacting between said part and the link.

9. In apparatus of the character described, a booster motor, a supporting link therefor having a bearing block at its lower end adapted to engage the booster bed plate and support the booster thereby and means above said plate and reacting therethrough against the said block to resiliently retain the booster in its normal supported position, said block and said bed plate being provided with cooperating convex and concave bearing surfaces.

In testimony whereof I have hereunto signed my name.

FRANK RICHARD PETERS.